United States Patent
Girshick et al.

(10) Patent No.: US 12,217,393 B2
(45) Date of Patent: Feb. 4, 2025

(54) PHOTO COMPOSITES

(71) Applicant: Ancestry.com DNA, LLC, Lehi, UT (US)

(72) Inventors: Ahna R. Girshick, Berkeley, CA (US); Luong Ruiz, San Bruno, CA (US); Jack Reese, Lindon, UT (US)

(73) Assignee: Ancestry.com DNA, LLC, Lehi, UT (US)

( * ) Notice: Subject to any disclaimer, the term of this patent is extended or adjusted under 35 U.S.C. 154(b) by 677 days.

(21) Appl. No.: 17/531,446

(22) Filed: Nov. 19, 2021

(65) Prior Publication Data

US 2022/0164935 A1 May 26, 2022

Related U.S. Application Data

(60) Provisional application No. 63/116,707, filed on Nov. 20, 2020.

(51) Int. Cl.
| | |
|---|---|
| *G06V 40/16* | (2022.01) |
| *G06F 16/55* | (2019.01) |
| *G06T 3/18* | (2024.01) |
| *G06T 5/50* | (2006.01) |

(52) U.S. Cl.
CPC ............ *G06T 5/50* (2013.01); *G06F 16/55* (2019.01); *G06T 3/18* (2024.01); *G06V 40/165* (2022.01)

(58) Field of Classification Search
CPC ... G06T 5/50; G06T 3/18; G06T 11/60; G06F 16/55; G06F 16/583; G06V 40/165; G06V 40/172; G06V 40/178; G06V 40/179
See application file for complete search history.

(56) References Cited

U.S. PATENT DOCUMENTS

| | | | |
|---|---|---|---|
| 9,940,433 B2 | 4/2018 | Han et al. | |
| 10,204,260 B2 * | 2/2019 | Linguraru | G06V 40/172 |
| 2017/0242957 A1 * | 8/2017 | Han | G16B 20/20 |
| 2019/0206571 A1 * | 7/2019 | Bates | G06F 16/248 |
| 2019/0362806 A1 * | 11/2019 | Ghali | G16B 10/00 |

OTHER PUBLICATIONS

Curtis, R.E et al., "Estimation of Recent Ancestral Origins of Individuals on a Large Scale," Proc Int'l Conf on Knowledge Discovery and Data Mining (KDD), Aug. 2017, pp. 1417-1425.

(Continued)

*Primary Examiner* — Phuoc Tran
(74) *Attorney, Agent, or Firm* — Fenwick & West LLP

(57) ABSTRACT

Systems, methods, and/or computer-program products for generating a photo composite are configured to identify a facial photo, assign a community such as a genetic community to the identified facial photo, select and retrieve a subset of photos from a genetic community, determine a landmark in each photo of the subset of photos, compute and apply a similarity transform to each photo based and its landmarks, update estimates of transformed averaged landmarks, calculate a triangularization of the transformed averaged landmarks, warp images to the average image landmarks, and combine the intensities of the warped images. The communities are identified from genetic information. The facial photos are identified from a network of genealogical trees and/or a collection of historical records.

19 Claims, 9 Drawing Sheets

(56) References Cited

OTHER PUBLICATIONS

Edmonds, L., "Meet the world's Mrs Averages: Scientists blend thousands of faces together to reveal what the typical woman's face looks like in 41 different countries from around the globe," Sep. 27, 2013, pp. 1-39, [Online] [Retrieved on Feb. 2, 2022] Retrieved from the Internet <URL: https://www.dailymail.co.uk/news/article-2435688/The-average-woman-revealed-Study-blends-thousands-faces-worlds-women-look-like.html>.
Face 2 Gene, "Face 2 Gene," Date Unknown, pp. 1-11, [Online] [Retrieved on Feb. 2, 2022] Retrieved from the Internet <URL: https://www.face2gene.com/>.
Face Research, "Face Research Demos," Date Unknown, pp. 1-2, [Online] [Retrieved on Feb. 2, 2022] Retrieved from the Internet <URL: http://faceresearch.org/demos/>.
Galston, F., "Composite Portraits," Nature, vol. 18, May 23, 1878, pp. 97-100.
Ginosar, S. et al., "A Century of Portraits: A Visual Historical Record of American High School Yearbooks," Extreme Imaging Workshop, International Conference on Computer Vision, ICCV 2015 and IEEE Transactions on Computational Imaging, Sep. 2017, pp. 1-7.
Han, E. et al., "Clustering of 770,000 genomes reveals post-colonial population structure of North America," Nature Communications, vol. 8, Article No. 14238, Feb. 7, 2017, pp. 1-12.
King, D.E., "Dlib-ml: A Machine Learning Toolkit," Journal of Machine Learning Research, vol. 10, Jul. 2009, pp. 1755-1758.
Lafrance, M. et al., "The Contingent Smile: A Meta-Analysis of Sex Differences in Smiling," Psychological Bulletin, vol. 129, No. 2, Mar. 2003, pp. 305-334.
Lippert, C. et al., "Identification of individuals by trait prediction using whole-genome sequencing data," PNAS 114(38), Sep. 2017, pp. 10166-10171.
Lubin, G., "What The Average Person Looks Like In Every Country," Feb. 10, 2011, pp. 1-21, [Online] [Retrieved on Feb. 2, 2022] Retrieved from the Internet <URL: https://www.businessinsider.com/faces-of-tomorrow-2011-2>.
Mallick, S., "Average Face: OpenCV ( C++ / Python ) Tutorial," May 7, 2016, pp. 1-9, [Online] [Retrieved on Feb. 2, 2022] Retrieved from the Internet <URL: https://learnopencv.com/average-face-opencv-c-python-tutorial/>.
Merler, M. et al., "Diversity in Faces," arXiv:1901.10436v6, Apr. 2019, pp. 1-29.
Palermo, F. et al., "Dating Historical Color Images," European Conference on Computer Vision, Oct. 2012, pp. 499-512.
Parkhi, O.M. et al., "Deep Face Recognition," Proceedings of the British Machine Vision Conference (BMVC), Sep. 2015, pp. 1-12.
Ribeiro, M.T et al., "Why Should I Trust You ?: Explaining the Predictions of Any Classifier," Proceedings of the 22nd ACM SIGKDD international conference on knowledge discovery and data mining, Aug. 9, 2016, pp. 1-10.
Salavon, J., "100 Special Moments," 2004, pp. 1-5, [Online] [Retrieved on Feb. 2, 2022] Retrieved from the Internet <URL: http://salavon.com/work/SpecialMoments/>.
Salavon, J., "The Class of 1988 & The Class of 1967," 1998, pp. 1-5, [Online] [Retrieved on Feb. 2, 2022] Retrieved from the Internet <URL: http://www.salavon.com/work/Class/>.
Velardo, C. et al., "Weight estimation from visual body appearance," IEEE, Oct. 2010, pp. 1-6.
Weber, I. et al., "Crowdsourcing Health Labels: Inferring Body Weight from Profile Pictures," arXiv:1602.07185, Feb. 23, 2016, pp. 1-10.
Wen, L. et al., "A computational approach to body mass index prediction from face images," Image and Vision Computing, vol. 31, Apr. 2, 2013, pp. 392-400.
Zhu, J-Y. et al., "AverageExplorer: Interactive Exploration and Alignment of Visual Data Collections," ACM Transactions on Graphics (SIGGRAPH 2014), vol. 33, No. 4, Aug. 2014, pp. 1-11.

* cited by examiner

PHOTO COMPOSITES

CROSS-REFERENCE TO RELATED APPLICATIONS

The present application claims the benefit of U.S. Provisional Patent Application 63/116,707, filed on Nov. 20, 2020, which is hereby incorporated by reference in its entirety.

FIELD

The disclosed embodiments relate to systems, methods, and/or computer-program products configured for retrieving, transforming, and/or generating composite photos of persons in a genealogical research service.

BACKGROUND

A large-scale database such as user profile and genetic database can include billions of data records. This type of database may allow users to build family trees, research their family history, and make meaningful discoveries about the lives of their ancestors. Users may try to identify relatives with datasets in the database. This may be done using both genealogical trees and by receiving DNA samples and providing genetic information based thereon, the genetic information being used to link persons to potentially related persons based on DNA.

Users of genealogical research services and other applications respond favorably to and receive indelible impressions from seeing images of ancestors, possibly related persons, and other people. Recent years have witnessed an explosion of growth in the volume of digitized photos—both newly captured photos and old photos which have been digitized. Facial or portrait photos capture patterns of aging, sex differences, and genetic diversity. But while humans can perceptually grasp these differences through observation and generalization from a limited number of photos, it is difficult to precisely characterize and observe these differences over larger populations.

Further, while there are many digitized photos on genealogical research services, for example, there is sometimes a paucity of images for certain of a user's ancestors for whom other genealogical information exists (such as grandparents, great-grandparents, and so on), as pertinent photos have not survived the passage of time or have not been uploaded to a public genealogical tree. Accordingly, it is often not possible for a user to see an image of a particular ancestor and thus to connect meaningfully to their origins. That is, a user may know of details about an ancestor, such as birth date, death date, and other details, without feeling as though they truly know that ancestor as they have never seen a photo of the ancestor. This can be a problem particularly for users without an established, extensive genealogical tree, such as casual users of a genealogical service who are attempting to start building a genealogical tree. Further, this deprives users of the ability to get a sense for facial traits.

Further, it is often not possible for a user to get a sense for what a representative person for a community or ethnicity to which they may be connected would have looked like at a given time period. Users therefore cannot "see" into the ancestral past of a genetic community or an ethnicity to which they belong. This limits the number of rewarding experiences such a user can have on/with a genealogical research service.

Thus, while attempts have been made to generate photo composites based on an average of a plurality of face images, there is currently no modality for doing so based on family, ancestry, and/or genetic relatedness for a historical, current, and/or yet-to-be-born person.

Additionally, while modalities have been provided with some success to predict traits, such as phenotypical traits like male-pattern baldness and eye color, or health traits like BMI, nutrient needs, and muscle fatigue, based on users' DNA, there is currently no approach that allows for predicting traits or DNA-specific details based on photos combined with genealogical information indicating heritability of traits.

Another problem is the lack of content pertaining to specific genetic or historical communities. While genetic communities have been determined using DNA results, historians who specialize in each such region, geographical area, and/or migration pattern are currently tasked with writing content relating to each such community. This necessarily entails a tremendous amount of manual effort and does not efficiently leverage historical records stored by certain genealogical research services.

In view of the foregoing, there is a need for an improved system, method, and/or computer-program product for photo linking, identification, retrieval, transformation, and composite generation, phenotype extraction from photos, and content generation for genetic communities.

SUMMARY

The photo composite systems, methods, and/or computer-program products embodiments advantageously address the drawbacks of existing genealogical research services and photo transformation approaches by facilitating automated photo identification, retrieval, transformation, and composite-generation in conjunction with genealogical and/or genetic research and/or data. In embodiments of the present disclosure, a photo composite is generated from or using a network of genealogical trees by identifying a plurality of nodes within the network of genealogical trees that meet a predetermined or selected criterion or criteria, retrieving one or more suitable photos from the identified nodes, transforming the retrieved one or more photos by filtering the photos, cropping the photos based on identified landmarks, and applying other transformations, and generating the photo composite by aligning the transformed photos. The predetermined or selected criterion or criteria may include grouping users by age, sex, and/or population. The population may be a determined genetic community, e.g. a group of users determined by genotype, ethnicity, survey answer (e.g. bald, disease status), a visualization modality for stitching together genealogical trees of persons who are genetic matches to a target person to visualize how a target person and a genetic match are related from a common ancestor through different family lines, or any other suitable grouping of potentially related users.

In embodiments, additional transformations may be performed, such as stylizing the photo composite with one or more appropriate filters or transformations to obscure resemblance to any particular individual. In other embodiments, transformations to the photo composite may be rendered to add time period- and/or location-specific features to the photo composite to more-accurately contextualize the photo composite within pertinent, predetermined, and/or user-selected cultural milieu. That is, features may be identified from a group of photos and/or from outside sources and thereafter applied to photo composites pertaining to a region and time. For example, a particular style of dress, hair, and/or make-up known or determined to be characteristic of the Meiji period in Japan may be applied to a photo composite of individuals from that time and place.

In embodiments, one or more features are selected or predetermined for the identification process. That is, a photo composite pertaining to people from a particular sex, time period, and/or location or other suitable discretization may be selected or predetermined and the network of genealogical trees is traversed accordingly to identify only photos pertaining to persons with the selected features. As persons—corresponding to nodes within the network of genealogical trees—may be associated with a plurality of photos arranged in a photo gallery, in embodiments the photo galleries of traversed and selected persons are traversed to identify a suitable, representative photo. A face detection modality may be utilized to filter out photos in the photo gallery and to identify a suitable portrait photo.

Alternatively or additionally, identified and retrieved photos may be filtered after retrieval according to one or more criteria. For example, photos may be filtered based on resolution, the number of faces detectable therein, and/or color schemes. In embodiments, photos with a resolution below a predetermined threshold, with no faces or more than one face, and in black and white, may be filtered out and not used. Photos may be filtered such that only photos with a face or faces that are arranged substantially straight-forward are shown or such that photos with faces in other arrangements are also shown.

In embodiments, photos comprising more than one face are segmented using a suitable segmentation modality, with the segmented portion comprising the face of a suitable person—e.g. a person corresponding to the predetermined or selected criteria for the photo composite—retained and utilized for generating the photo composite. In embodiments, first the embodiments may determine whether a "profile picture" is associated with a tree node (e.g. a node in a genealogical tree corresponding to an individual in a family tree), and if so, the profile picture may be automatically retrieved along with metadata such as a photo date (if available), genetic community assignment, ethnicity, survey responses pertaining to e.g. height and weight, genotype, match information, and/or sex, birth year of the corresponding tree person.

Additionally, or alternatively, a genealogical tree associated with the user may be retrieved. In embodiments, ahnentafel relationship data may also be retrieved for ancestral photos, along with, e.g., birth year, age of the ancestor in the photo, ethnicity, survey response, genotype, a modality for stitching together genealogical trees of persons who are genetic matches to a target person to visualize how a target person and a genetic match are related from a common ancestor through different family lines, matching info, etc. Pertinent historical records that indicate or confirm traits may additionally be retrieved.

Privacy may be maintained by identifying photos from, in embodiments, living persons who have submitted a DNA sample, are above 18 years of age, have consented to their information being used for research, and have made their genealogical trees publicly viewable as opposed to being private. Ancestral photos may likewise only be obtained from deceased ancestors of the same. Photos identified from historical persons who are deceased ancestors of current users may only be obtained from publicly viewable genealogical trees. "Living persons" may be determined based on birth dates, e.g. those born between certain years (e.g. 1950 to 2003), to ensure that photos are obtained from consenting, living adults.

Identified, retrieved, and filtered photos may be transformed by identifying a plurality of facial landmarks using a suitable facial detection and/or facial recognition modality, such as one available through dlib, e.g. a histogram of oriented gradients ("HOG")- and linear support vector machine ("SVM")-based and/or convolutional neural network ("CNN")-based modality, e.g. a max-margin ("MMOD") CNN-based modality. A predetermined number of features such as facial landmarks may be identified from the filtered photos using the facial detection and/or recognition modality. In an embodiment, the number of facial landmarks is 68.

Among the detected facial landmarks, a mouth, right eyebrow, left eyebrow, right eye, left eye, nose, and jaw may be detected. In embodiments, the first through $17^{th}$ landmarks trace or define the outline of the jaw, the $18^{th}$ through $22^{nd}$ landmarks trace or define the right eyebrow, the $23^{rd}$ through $27^{th}$ landmarks trace or define the left eyebrow, the $28^{th}$-$31^{st}$ landmarks trace or define a vertical and/or top component of the nose, the $32^{nd}$ through $36^{th}$ landmarks trace or define a bottom and/or lateral component of the nose, the $37^{th}$ through $42^{nd}$ landmarks trace or define the right eye, the $43^{rd}$ through $48^{th}$ landmarks trace or define the left eye, and the $49^{th}$ through $68^{th}$ landmarks trace or define the mouth.

These landmarks may be part of a 68-point iBUG 300-W dataset for training the landmark predictor. While 68 landmarks have been described, in other embodiments a 5-point model may be used, a 194-point model based on the HELEN dataset may be used, or any other suitable number and combination of landmarks and/or datasets may be used. For example, a 3D face mesh detection per the MediaPipe library may alternatively be used. In embodiments, the landmarks are identified and then saved as a list of xy coordinates.

The facial detection and/or recognition modality may be configured to receive and transform only photos filtered to show only faces that are arranged in a straight-forward or substantially straight-forward arrangement, or photos filtered to show faces that are arranged in a variety of viewing angles.

Facial landmarks may be identified by first performing object detection within a filtered photo and in embodiments localizing a detected face within the photo, and by detecting the landmarks on the face region of interest ("ROI"). Object detection of the face may be performed using a pre-trained model, such as Haar cascades or a HOG+linear SVM object detection model, or a deep learning-based algorithm for face localization. This yields a bounding box predicting the location of a face. Facial landmark detection may use a model trained using a labeled set of facial landmarks on an image specifying coordinates of regions surrounding each facial structure, and/or using priors, i.e. the probability on distance between pairs of input pixels. Using such training data allows for training, e.g., an ensemble of regression trees to estimate facial landmark positions directly from the pixel intensities without feature extraction.

Transformation of the filtered images may include warping of the filtered images. To do so, a triangulation of facial landmarks is first determined. Delauney Triangulation, variations thereof, and/or other suitable modalities, may be used to triangulate the landmark points. That is, in embodiments, given a set of landmarks, the image may be subdivided into a plurality of triangles with the landmarks as vertices. In embodiments, triangles are chosen such that no landmark is inside the circumference of any triangle.

A minimum number of photos may be filtered and transformed before generation of a photo composite to avoid identifiability of an individual therefrom based on, e.g., distinctive hair, facial hair, glasses, clothing, hats, etc. A metric may be determined for such distinctive features and the minimum number of photos may be increased proportionally to the metric.

In embodiments, facial landmarks are detected from a detected face area in an image, and then the image is transformed using the facial landmarks to align the facial landmarks to a centered landmarks map. That is, the facial landmarks can be used to warp the rest of the image to align to a hypothetical perfectly aligned arrangement of landmarks.

Additionally or alternatively, retrieved photos may be utilized to generate phenotype data. In embodiments, body-mass index ("BMI") may be extracted from facial photos, appearance traits such as hair/skin pigmentation, freckling, facial morphology, wellness traits such as balding, skin-burn risk, height, weight, and/or health traits may be determined from the retrieved photos. Confidence measures pertaining to the predictions may also be provided.

Traits extracted may be used to link a user's traits to traits of their ancestors for understanding heritability. Traits may also be aggregated by genetic community or any other stratification of population. Traits extracted from photos may likewise be used as a supplement to or confirmation of survey response data for trait-prediction models. For example, the traits extracted from retrieved photos may be used as features or labels to train trait-prediction models and/or to annotate a genetic network. As a result, users may receive information pertaining to a shared trait with an ancestor ("You and your grandfather both have blue eyes"), a shared trait with a community, or a likelihood of having a trait based on trait-prediction model results.

In other embodiments, phenotypes or traits, such as appearance phenotypes like pigmentation, hair color, skin color, eye color, race, hair texture, facial morphology, freckling, arched eyebrows, double chin, high cheekbones, bushy eyebrows, nose size, oval face, pale skin, straight/wavy/curly hair, rose cheeks, etc. or wellness phenotypes like male-pattern baldness, BMI, sleep apnea, wrinkles, may be estimated from facial photos. In embodiments, an individual's or genetic population's facial photo or photo composite may be paired with a genotype or aggregate genotype. As described above, photos may be retrieved and filtered to remove low-resolution photos and/or photos that do not have a face or that have more than one face. A convolutional neural network ("CNN") classifier may be trained and utilized to estimate appearance attributes in facial photos. Appearance attributes estimated by the CNN classifier may include hair color, eye color, skin color, facial aspect ratio, baldness, wearing a hat, wearing glasses, etc.

In an embodiment, a deep learning Caffe CNN is utilized, though other suitable modalities are also envisioned. The Caffe CNN is trained using a user-generated content image dataset with initial manual labelling of approximately 2,000 images upon which data augmentation (such as rotation, mirror, brightness, and/or other adjustments) has been performed. The image dataset can be augmented with any suitable types of transformations or features that are commonly observed in profile pictures or other images of interest. For example, augmentation may allow for artificial expansion of a training dataset by creating modified versions of images in the dataset, and may include operations such as shifts, flips, including horizontal flips, rotations including minor random positive and negative rotations, random brightness deltas, random color shift deltas, grayscaling, minor random cropping modifications, saturation modifications, zooms, combinations and/or modifications thereof, or any other suitable adjustment.

The model predicts attributes, and the predictions are manually fixed until accuracy is satisfactory. It has been found that 75% accuracy for Top-1 predictions and 85% accuracy for Top-1 and Top-2 predictions can be achieved after four to five iterations, with greater accuracy achieved with further iterations. The model can be further improved by comparing survey respondents' photos and responses.

Alternatively or additionally, a 3D facial landmark measurement tool, such as OpenFace developed by Tadas Baltrusaitis and CMU MultiComp Lab, Face Plus Plus, Hyperface, Google Vision API, etc., variations or combinations thereof, or any other suitable tool, may be used.

The confidence in the estimated appearances may be revised or filtered based on whether a person is determined to be wearing a hat (in which case the classifier's hair color or baldness prediction confidence is downgraded), whether a person is wearing glasses (in which case the classifier's eye color prediction confidence is downgraded), and/or whether the facial pose is beyond a threshold level from straightforward (in which case the classifier's predictions are downgraded).

A photo associated with a user who has submitted a DNA sample may be used to improve or train a machine learning model for estimating traits of other individuals in embodiments. Estimated attributes may be utilized as training labels to train the machine learning model to predict hair color from photos based on genetics and other features, for example. Estimated attributes may be utilized to supplement genetic estimates. Additionally or alternatively, training labels may be derived from survey results and/or from DNA results (e.g. to determine a carrier status of a disease). Photos may also be utilized to compare an individual's appearance against their genetic population using facial similarity methods. This advantageously allows information previously available only from user survey responses (which are subject to inherent limitations and accuracy issues) to be detected automatically, accurately, and consistently.

In embodiment, content may be automatically created for a genetic community based on its respective set of enriched record collections. Enriched record collections may include content generated using computer vision and/or natural language processing ("NLP") modalities. For example, content may be created using NLP methods on structured data. Collections may contain records with structured data such as birth, death, census, and draft data. This data may be turned into structured/tabled data using methods such as optical character recognition ("OCR"). Structured/tabled data can be input into templates, such as narrative templates, to generate characterizations of community attributes during different periods of time.

These and other features of the present disclosure will become better understood regarding the following description, appended claims, and accompanying drawings.

Figure 1:
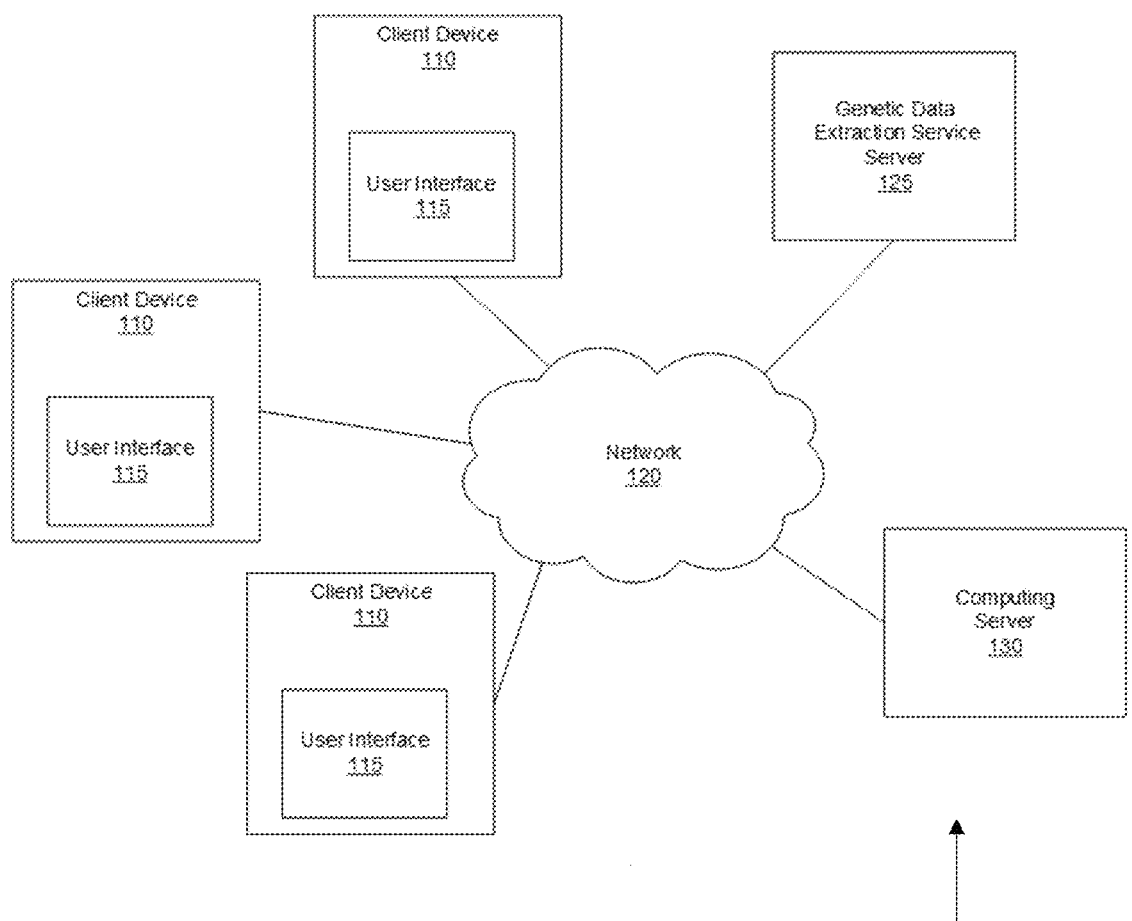
FIG. 1 illustrates a diagram of a system environment of an example computing system, in accordance with an embodiment.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of systems and methods for photo composites, and in no way limit the structures, configurations, or functions of systems and methods for photo composites, and components thereof, according to the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Introduction

Although the embodiments of the disclosure are adapted for providing systems and methods for photo composite generation in conjunction with genealogical research platforms and services, it will be appreciated that the principles of the disclosure may be adapted to any suitable application. Systems and methods for photo composite generation may be provided for users of any application and/or for any type of photo manipulation and/or genealogical or genetic research, and are not limited to ancestral photo composites.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of systems and methods for photo composite generation, certain modules and features are described independently. The modules and features may be synergistically combined in embodiments to provide a photo composite generation system, method, and/or computer-program product.

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

While reference is made herein to "photos," it will be appreciated that photos may refer to any suitable image and is not limited to digitized historical photos, portrait photos, or otherwise. On the contrary, any reference made herein to "photos" will be understood to encompass images of any suitable origin and/or any suitable medium and/or of any suitable topic.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

FIG. 1 illustrates a diagram of a system environment 100 of an example computing server 130, in accordance with an embodiment. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliance (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In one embodiment, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In one embodiment, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In one embodiment, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc.

Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In one embodiment, a set of SNPs (e.g., 300,000) that are shared between different array platforms (e.g., Illumina OmniExpress Platform and Illumina HumanHap 650Y Platform) may be obtained as the genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in one embodiment, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci.

A genetic locus is a segment of a genetic sequence. A locus can be a single site or a longer stretch. The segment can be a single base long or multiple bases long. In one embodiment, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, phenotypes are examples of biomarkers.

The computing server 130 performs various analyses of the genetic data, genealogical data, and users' survey responses to generate results regarding the phenotypes and genealogy of users of computing server 130. Depending on the embodiments, the computing server 130 may also be referring to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users.

The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In one embodiment, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In one embodiment, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
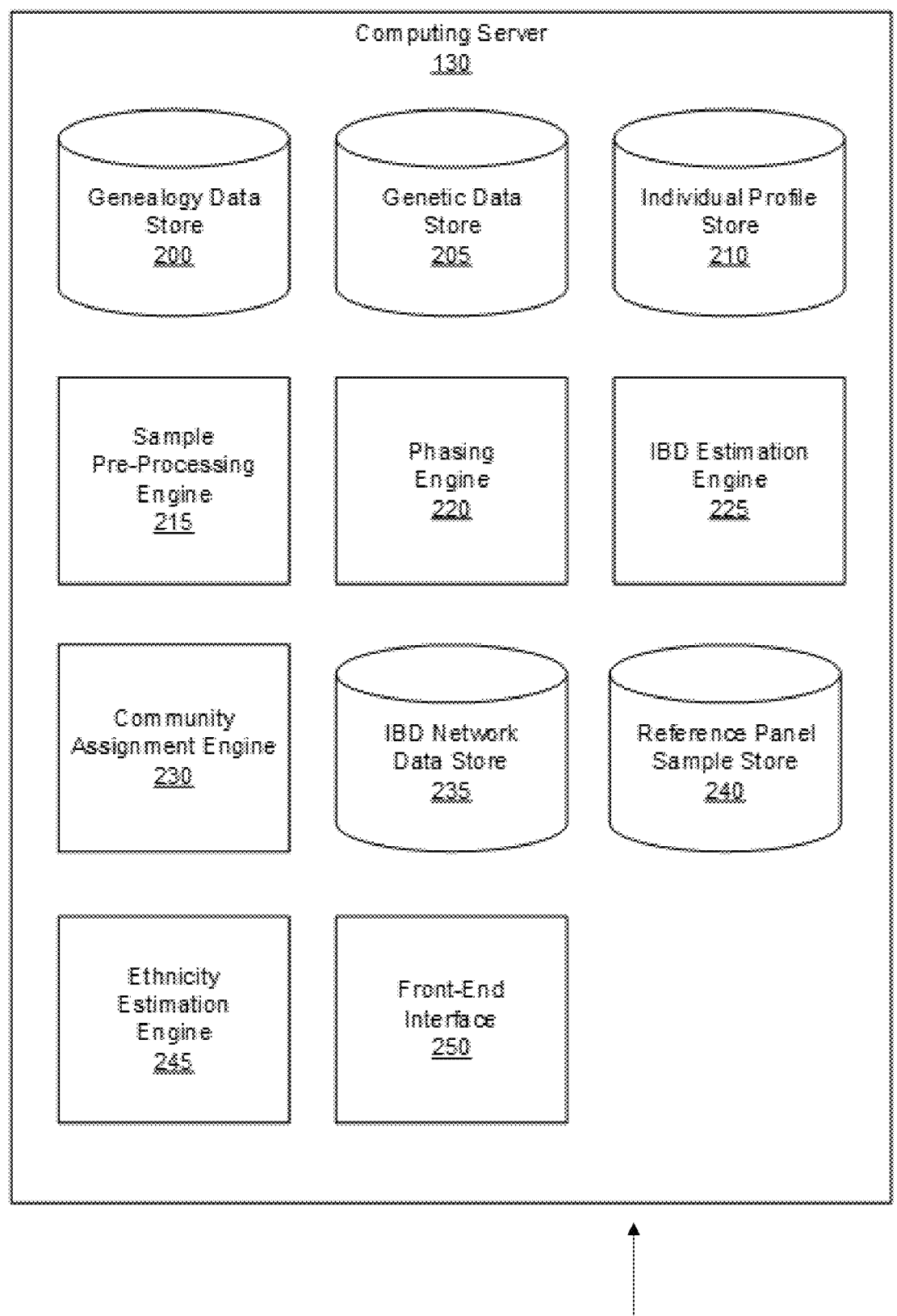
FIG. 2 is a block diagram of an architecture of an example computing system, in accordance with an embodiment.

FIG. 2 is a block diagram of an architecture of an example computing server 130, in accordance with an embodiment. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, and a front-end interface 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogical data, survey response data, and photos of the users and related individuals. The computing server 130 processes the genetic data of users to identify shared identity-by-descent (IBD) segments between individuals. The genealogical data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to basic information of the user (e.g., name, date of birth, birthplace, etc.) and later on more advanced questions that may be useful for obtaining additional genealogical data. The computing server 130 may also include survey questions regarding various traits of the users such as the users' phenotypes, characteristics, preferences, habits, lifestyle, environment, etc.

Genealogical data may be stored in the genealogical data store 200 and may include various types of data that are related to tracing family relatives of users. Examples of genealogical data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, offspring in some cases. Genealogical data may also include connections and relationships among users of the computing server 130. The information related to the connections among a user and her relatives that may be associated with a family tree may also be referred to as pedigree data or family tree data.

In addition to user-input data, genealogical data may also take other forms that are obtained from various sources such as public records and third-party data collectors. For example, genealogical records from public sources include birth records, marriage records, death records, census records, court records, probate records, adoption records, obituary records, etc. Likewise, genealogical data may include data from one or more of a pedigree of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogical data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data of the whole or portions of an individual's genome. The genetic data store 205 may store a pointer to a location associated with the genealogical data store 200 associated with the individual. A genetic dataset may take different forms. In one embodiment, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of a diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

A genotype at a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogical database. A unique individual identifier may a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointer associating genetic datasets such as genotype and phased haplotype data of the individual that are saved in the genetic data store 205. The metadata about the individual may also individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like.

In one embodiment, the user profile data may also include one or more photos of the users and photos of relatives (e.g., ancestors) of the users that are uploaded by the users. A user may authorize the computing server 130 to analyze one or more photos to extract information, such as user's or relative's appearance traits (e.g., blue eyes, curved hair, eye aspect ratio, facial aspect ratio, nose aspect ratio, freckling, hair curl, earlobe type, age in photo, etc.), from the photos. The photos may also be retrieved from other sources such as public records. In some cases, the computing server may allow users to upload many different photos of the users, their relatives, and even friends. The appearance traits and other information extracted from the photos may also be saved in the profile store. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have family history as one of the risk factors, questions regarding any diagnosis of increased risk of any diseases or disorders, and questions concerning wellness-related issues such as family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's diseases, diabetes, cancer, and obesity. The computing server 130 may obtain data of a user's disease-related phenotypes from survey questions of health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as ability to sense an asparagus metabolite. Traits may also be collected from historical records, electronic health records and electronic medical records.

The computing server 130 also may present various survey questions related to environmental factors of users. In this context, an environmental factor may be a factor that is not directly connected to the genetics of the users. Environmental factors may include users' preferences, habits, and lifestyle. For example, a survey regarding users' preferences may include questions related to things and activities that users like or dislike, such as types of music a user enjoys, dancing preference, party-going preference, certain sports that a user plays, video games preferences, etc. Other questions may be related to the users' diet preference such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has smartphone or doesn't, has car or doesn't).

Surveys also may be related to other environmental factors such as geographical, social-economic, or cultural factors. Geographical questions may include questions related to the birth location, family migration history, town or city of users' current or past residence. Social-economic questions may be related to users' education level, income, occupations, self-identified demographic groups, etc. Questions related to culture may concern users' native language, language spoken at home, customs, dietary practices, etc.

For any survey questions asked, the computing server 130 may also ask an individual the same or similar questions regarding the traits and environmental conditions of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogical data store 200 and genetic data store 205.

The user profile data, photos of users, survey response data, the genetic data, and the genealogical data may subject to the privacy and authorization setting from the users to specify any data related to the users can be accessed, stored, obtained, or otherwise used. For example, when presented with a survey question, a user may select to answer or skip the question. The computing server 130 may present users from time to time with information regarding users' selection of the extent of information and data shared. The computing server 130 also may maintain and enforce one or more privacy settings for users in connection with the access of the user profile data, photos, genetic data, and other sensitive data. For example, the user may pre-authorize the access of the data and may change the setting as wish. The privacy settings also may allow a user to specify (e.g., by opting out, by not opting in) whether the computing server 130 may receive, collect, log, or store particular data associated with the user for any purpose. A user may restrict her data at various levels. For example, in one level, the data may not be accessed by the computing server 130 for purposes other than displaying the data in the user's own profile.

On another level, the user may authorize anonymization of her data and participate in studies and research efforts conducted by the computing server 130 such as a large-scale genetic study. In yet another level, the user may turn some portions of her genealogical data public to allow the user to be discovered by other users (e.g., potential relatives) and be connected in one or more family trees. In some cases, users may also consent or opt out for having their data included in research purpose conducted by processes carried out by computing server 130. Access or sharing of any information or data in the computing server 130 may also be subject to one or more similar privacy policies. A user's data and content objects in the computing server 130 may also be associated with different levels of restriction. The computing server 130 may also provide various notification feature to inform and remind users of their privacy and access settings.

For example, when privacy settings for a data entry allow a particular user or other entities to access the data, the data may be described as being "visible," "public," or other suitable labels, in contrary to a "private" label.

In some cases, the computing server 130 may have a heightened privacy protection on certain types of data and data related to certain vulnerable groups. In some cases, the computing server 130 may also enforce a strict prohibition of using, accessing or conduct any research on a certain vulnerable group. In the case of heightened privacy, the settings may specify that data subject to those settings require prior approval for access, publication, or other use. In some cases, the computing server 130 may provide the heightened privacy as a default setting for certain types of data, such as genetic data or any data that the user marks as sensitive. The user may opt in for sharing of those data or change the default privacy settings. In other cases, the heightened privacy settings may apply across the board for all data of certain groups of users. For example, if the computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data or have policy that prohibits the use and access of such data.

The sample pre-processing engine 215 receives and pre-processes data received from various sources to change the data into a format used by the computing server 130. For genealogical data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogical data and survey data. Additional data may be obtained from scans of public records and other historical records, public or proprietary. The data may be manually provided or automatically extracted via, for example, optical character recognition ("OCR") performed on census records, town or government records, or any other item of printed or online material. Some records may be obtained by digitalizing written records such as older census records, birth certificates, death certificates, draft records, immigration records, consented medical records, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. The human genome mutation rate is estimated to be $1.1*10^{-8}$ per site per generation. This leads to a variant approximately every 300 base pairs. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites.

Alternatively, the pre-processing of this conversion may be performed by the genetic data extraction service server 125. The sample pre-processing engine 215 identifies autosomal SNPs in an individual's genetic dataset. In one embodiment, the SNPs may be autosomal SNPs. In one embodiment, 700,000 SNPs may be identified in an individual's data and may be stored in genetic data store 205. Alternatively, in one embodiment, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together.

The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. patent application Ser. No. 15/519,099, entitled "Haplotype Phasing Models," filed on Oct. 19, 2015, describes one possible embodiment of haplotype phasing.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or in imputation.

The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogical data store 200. U.S. patent application Ser. No. 14/029,765, entitled "Identifying Ancestral Relationships Using a Continuous stream of Input," filed on Sep. 17, 2013, and U.S. patent application Ser. No. 15/519,104, entitled "Reducing Error in Predicted Genetic Relationships," filed on Apr. 13, 2017, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used in assigning communities. For example, in one embodiment, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. patent application Ser. No. 15/168,011, entitled "Discovering Population Structure from Patterns of Identity-By-Descent," filed on May 28, 2016, describes one possible embodiment of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, in determining the ethnic composition of an individual, and in determining the accuracy in any genetic data analysis, such as by computing a posterior probability of a classification result from a classifier.

A reference panel sample may be identified in different ways. In one embodiment, an unsupervised approach in community detection may apply the clustering algorithm recursively for each identified cluster until the sub-clusters contain a number of nodes that is smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, other quality control. Principal component analysis may be used to creates clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In one embodiment, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node group. Each node group, representing a window, includes a plurality of nodes. The nodes representing different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverses the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels.

The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. patent application Ser. No. 15/209,458, entitled "Local Genetic Ethnicity Determination System," filed on Jul. 13, 2016, describes an example embodiment of ethnicity estimation.

The front-end interface 250 may display various results determined by the computing server 130. The results and data may include the IBD affinity between a user and another individual, the community assignment of the user, the ethnicity estimation of the user, phenotype prediction and evaluation, genealogical data search, family tree and pedigree, relative profile and other information. The front-end interface 250 may be a graphical user interface (GUI) that displays various information and graphical elements. The front-end interface 250 may take different forms. In one case, the front-end interface 250 may be a software application that can be displayed at an electronic device such as a computer or a smartphone. The software application may be developed by the entity controlling the computing server 130 and be downloaded and installed at the client device 110. In another case, the front-end interface 250 may take the form of a webpage interface of the computing server 130 that allows users to access their family tree and genetic analysis results through web browsers. In yet another case, the front-end interface 250 may provide an application program interface (API).

Photo Composite Generation

In one embodiment, the computing server 130 may create a photo composite from a group of individuals who share one or more characteristics based on their genetic data and/or genealogy data. The photo composite may be generated from photos of users of the computing server 130 and of their ancestors or relatives uploaded by the users or retrieved from other sources such as public records. A user may identify certain characteristics and ask the computing server 130 to generate a photo composite of a group of individuals or their ancestors who share the characteristics. The photo composite may also be used as a way of protecting the privacy of individuals whilst conveying relevant facial content. For example, the photo composite may be used as a profile picture of an individual for the individual's public profile so that her privacy can be protected.

In one embodiment, a facial photo composite may be generated based on a group of users based on the user's selection of other users to be included in the group or selection of certain characteristics. Based on their privacy setting, those users who may be included in the photo composite have voluntarily consented to have their photos used in the photo composite and other information discoverable. The user who intends to generate a photo composite may select consented users by age (e.g., approximate age when the photo was taken), gender, population, DNA community such as those who are related to each other by identity by descent (IBD), such as those who are determined based on IBD estimated engine 225 and community assignment engine 230.

In another embodiment, the user may select consented users by shared DNA, survey answer (e.g., baldness, disease status), and sharing of certain alleles in some genetic loci. To prevent users from generating photo composites for improper or inappropriate purposes, the computing server 130 may prohibit certain types of sensitive information from being accessible in selecting consented users to generate a photo composite. For example, the computing server 130 may prohibit the selection of users, even though they are consented, based on race, religion, status of certain vulnerable group, such as minors, and other sensitive types of information.

A user may also ask the computing server 130 to generate a facial photo composite of ancestors of users. The ancestors may be grouped by their birth year, age, gender, sex, and population. For example, a user may request an estimated photo of a representative ancestor of a genetic community at a particular time period (e.g., a Munster Irish female born 1800-1825, age 20-35 in the photo). In one embodiment, the computing server 130 may group ancestors by the population of their descendants who took the DNA tests and have DNA data stored in computing server 130. In another embodiment, the users may also be grouped by shared DNA, survey answer, (e.g., baldness, disease status), sharing of some genetic loci, and genetic community such as those who are related by each other by identity by descent. Again, to prevent users from generating photo composites for improper or inappropriate purposes, some restrictions to the generation of photo composite of ancestors may apply. In embodiments, sex may be automatically detected using any suitable modality from photos where sex is not provided in the associated record and/or genealogical tree. Where the age of a person in a photo is not provided in the associated record and/or genealogical tree, the age may be automatically detected using any suitable modality.

To select consented users based on a user's request, the computing server 130 may retrieve genetic data and/or genealogy data of a plurality of consented individuals. The computing server 130 classifies a subset of the individual as a group based on one or more characteristics extracted from the genetic data and/or genealogy data. The classification may be performed based on the characteristics reflected in the data or characteristics that are generated through analysis of the genetic data. For example, the sex and birth year of the individuals as reflected in the genealogy data (e.g., profile data) may be used directly in the classification. In another case, the computing server 130 analyzes the genetic dataset to determine genetic community of the individuals. For example, the computing server 130 may use a hidden Markov model to determine the ethnicity composition of the individuals and use the composition to classify a subset of individuals as a group. The computing server 130 may also cluster individuals based on their genetic datasets to generate one or more genetic communities.

The computing server 130 may receive a plurality of photos of consented users such as profile pictures uploaded by the users, photos uploaded to family trees, or suitable other photos uploaded by the users for various purposes. Based on the selection of a user, the computing server 130 may retrieve the photos of the subset of the individuals who belong to the group. The computing server 130 may filter the photos to remove those that are not suitable for creating a photo composite. For example, the photos that have a low resolution, multiple persons, or an incompatible color scheme may be filtered. The computing server 130 may also use facial recognition technology to identify correct face, feature, or person in a multi-person photo or to eliminate a photo that may have photo-name mismatch (e.g., a user uploading a celebrity photo as his profile picture).

The computing server 130 may sample a subset of photos. For example, about 10 photos may be sampled from the photos of individuals in the subset. In other embodiments, 30-60 photos are sampled. The computing server 130 determines the facial landmarks of the sampled photos. The landmarks may be key points (tips, sides, edges) of the features (nose, mouth, eyes, eyebrow, etc.) of a facial photo. The computing server 130 may transform the sampled photos into the same coordinate systems with the same resolutions. Based on the identified landmarks, the computing server 130 may create a mask that is formed from Delaunay triangulation and align and warp the photos based on the identified landmarks. The computing server 130 aggregates the subset of photos to generate a photo composite representative of an estimated image of the group of individuals sharing the characteristics. Various suitable aggregation techniques, such as simple averaging, weighted averaging, filtering, sampling, kernels, may be used. Various facial regions may be separately treated and recombined. For example, each facial region can be an average of certain subsets of photos or a random sampling of several photos.

The computing server 130 may also generate a facial photo composite of ancestors of the genetic community at a particular time. The computing server 130 may identify one or more ancestors of the individuals in the community. If any photos of the ancestors are available, the computing server 130 may take the photos into consideration. The computing server 130 may also retrieve a plurality of photos of the individuals in the community. The computing server 130 may create, based on the retrieved photos, a photo composite representative of an estimated image of the one or more common ancestors. The computing server 130 may generate images that are defined by genetics. The creation of a photo composite may include certain selection and filtering processes. For example, the computing server 130 may select ancestors that are of the same gender and have similar ages in the photo. One or more convolutional neural networks may be trained to recognize the gender and age group of the individual in a photo.

Figure 3A:
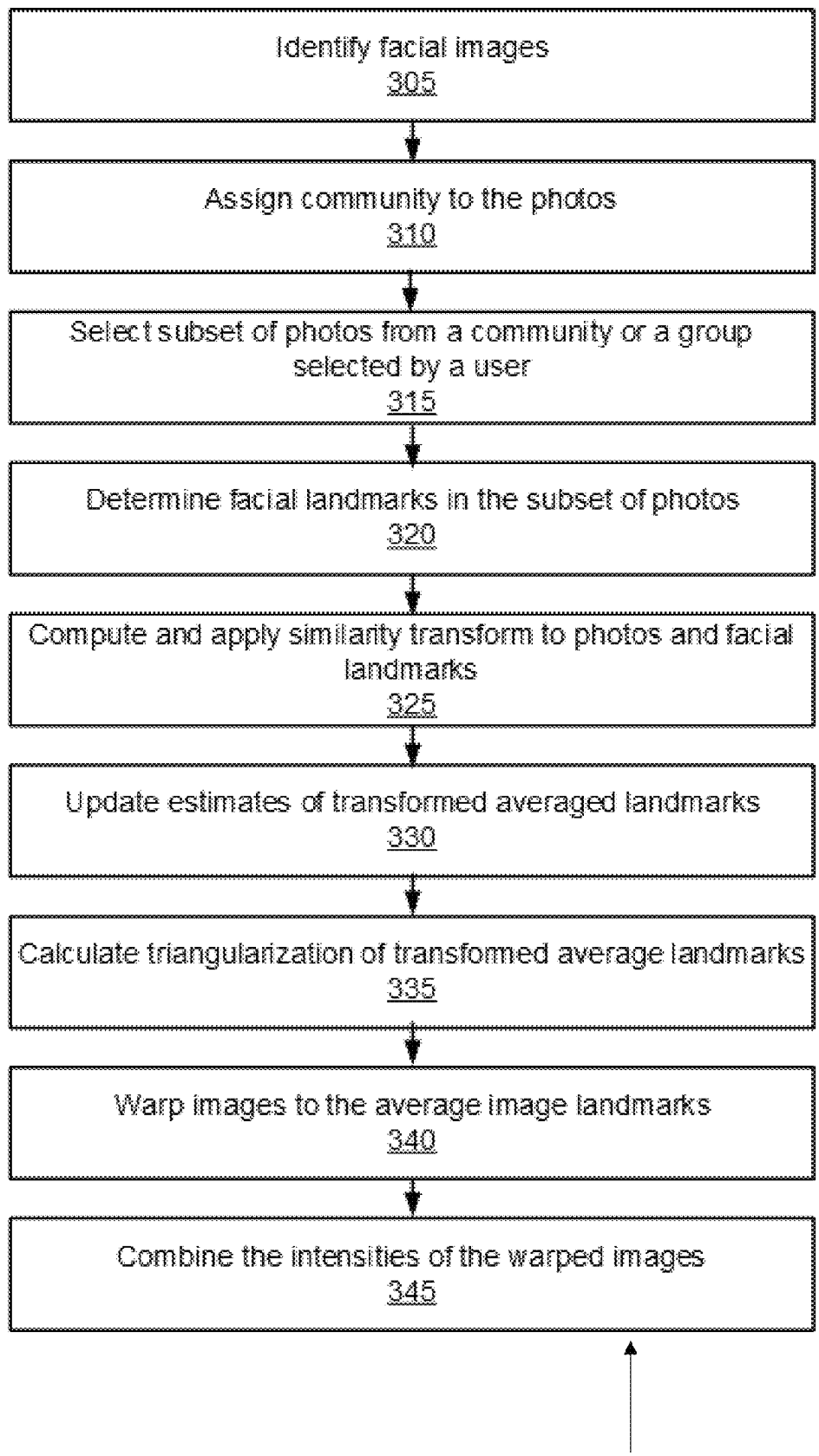
FIG. 3A is a method of generating a photo composite according to an embodiment.

Turning to FIG. 3A, a method 300 of generating a photo composite is shown and described. To generate an aggregate facial photo composite, facial photos are identified 305. The photos may be identified and retrieved from a network of genealogical trees, e.g. a stitched tree database. When identifying and/or retrieving the photos, a birth year, sex, genetic information, and/or other information as suitable may be simultaneously retrieved and stored.

In some embodiments, the photos may be identified and retrieved from a particular group, e.g. based on and/or in response to a predetermined stratification such as sex, age, and genealogical and/or genetic relatedness. For example, to present a user with a photo composite of ancestors for whom photos are not present in a genealogical tree, embodiments may traverse the stitched tree database and/or existing genetic communities to identify a plurality of tree persons with photos in an estimated date range and sex which may be transformed to provide the user with a photo composite pertaining to one or more ancestors.

That is, in embodiments, the input data for generating a photo composite may be as follows: For living people, birth year and/or age in a particular selected photo, sex, genetic information may be retrieved along with the selected photo (s). For ancestors/historical people, a descendant's genetic information, genealogical tree, photos, sex, and/or birth year or age in photo of the ancestors/historical people may be retrieved along with the selected photo(s). For yet-to-be-born people, a birth year, age in photo, sex, genetic information, and photo of a particular community, age group, and/or sex may retrieved along with photos.

Communities are assigned to the retrieved photos 310 based on DNA and non-DNA data of the subjects of the photos. Community assignments may be genetic community assignments, which may be based on shared DNA, distant ancestral ethnicity, family membership, membership in a particular admixed community, carrier populations, combinations and/or variations thereof, and the like. Community assignments may also or alternatively be based on a set of individuals that share a sex, birth year, age in photo, or family tree.

That is, in an embodiment, a stratification of the retrieved photos may be drawn so as to create a photo composite of members of a community, e.g. Munster Irish, as well as based on sex and date of birth, e.g. Munster Irish females born 1850-1875. The community assignment may combine photos from persons belonging exclusively to different groups. For instance, a photo composite for an admixed population, e.g. half African-American and half Japanese-American, may be generated by selecting the photos from members of African-American genetic communities and Japanese-American genetic communities and optionally selecting based on sex and/or birth year or birth year bucket (e.g., young, middle-aged, old). Communities may alternatively be assigned based on phenotypic traits or carrier status for certain traits, like hair color. By assessing photos or composite photos of genetic communities of carriers vs. non-carriers, visual traits of carriers that would not have been otherwise discernable can be detected, understood, and communicated.

For living people, DNA may be used to identify a plurality of individuals who share a genetic population, sex, and/or birth year or age in photo. For historical people, DNA may be used to identify a plurality of individuals who share a genetic population with genetic and/or genealogical information being used to identify the plurality of individuals' ancestors, from whom photos and pertinent information can be retrieved.

Retrieved photos may be filtered out based on the resolution of the photo, the number of subjects in the photo, and the color palettes of the photo (e.g., filter out photos that are black and white, or exclude color photos). In embodiments, photos below a predetermined minimum resolution threshold are filtered out, photos with no faces or more than one face are filtered out, and/or photos of particular color schemes are filtered out. Information about the subjects of the facial images may be provided or automatically detected. Information may include gender, age, and birth year. This information may be used to separately aggregate photos to generate a facial composite on predetermined and/or selected subsets of community members.

A subset of photos associated with a community may be selected 315. Other methods of selection based on a user's specification may also be possible. The selection of the subset of photos may be a random selection of N photos. N may be greater than a predetermined minimum threshold, e.g. 10. It has been found that increasing N above 10 smooths out personally identifiable details in the selected subset of photos. Facial landmarks in the selected subset of photos are determined and registered 320 so that landmarks are averaged with like landmarks (e.g., noses are averaged with other noses). In embodiments, the facial landmarks are registered to a standard set of facial landmarks. Any suitable number and combination of landmarks may be utilized, for example 68 landmarks corresponding together to the jaw, eyebrows, eyes, nose, and mouth. This may be done by cropping each photo in the selected subset with a facial bounding box of optionally predetermined dimensions and determining the same or substantially the same landmarks in each photo.

For each photo, a similarity transform is computed and applied 325 to the determined landmarks and to the cropped photo. In some embodiments, the similarity transform is an affine similarity transform. This facilitates warping so that eye corners are in the same standard position across the photos. Estimates of the transformed averaged landmarks for the subset of photos are updated 330.

After the similarity transform is determined for each photo, a triangularization (e.g., the Delauney Triangularization) of averaged transformed landmarks and boundary points is determined or calculated 335. The images in the subset of images are warped 340 to the averaged image landmarks, and the intensities of all the images in the subset are averaged. For example, the intensities of the warped images may be combined 345 and divided by N to yield an average intensity. For example, a weighted average of the faces in the images is taken based on the facial landmarks. In some embodiments, the weights have a value of unity, akin to an unweighted average. Alternatively, different weighting schemes may be used to emphasize modes in facial distribution.

Photo composites generated using the above-described embodiments may advantageously allow for visualizing one or more traits of a particular stratification of users and/or historical people. For example, a photo composite allows for comparisons between different populations with regards to aging processes, sex differences optionally at different ages, ethnicity differences optionally at particular sexes and ages, carrier status vs. non-carrier status optionally between different ethnicities, combinations and/or variations thereof, or any other suitable comparison. Photo composites may be generated for unborn persons for purposes of forensics, family planning, or entertainment to average two photo composites generated for two distinct DNA groups to visualize what children of a member of each of said DNA groups would look like.

Photo composites may be generated to visualize ancestors in a genealogical tree or a simulated genealogical tree by generating photo composites for one or more ancestors based on photos stratified by birth year, age in photo, sex, and/or genetic community. A genealogical tree may be simulated by combining any available genealogical tree data or structure with an estimated genealogical tree with predetermined typical generation times used for determining the appropriate stratification of birth years for particular ancestors. That is, for a user who has submitted a DNA sample but has not built or been included in a genealogical tree, a predetermined typical generation time of 25 years may be used to generate a photo composite representing mother, father, grandparents, great-grandparents, and so on, based on the genetic communities, ethnicities, or other groups to which the user's parents are determined to belong.

Figure 3B:
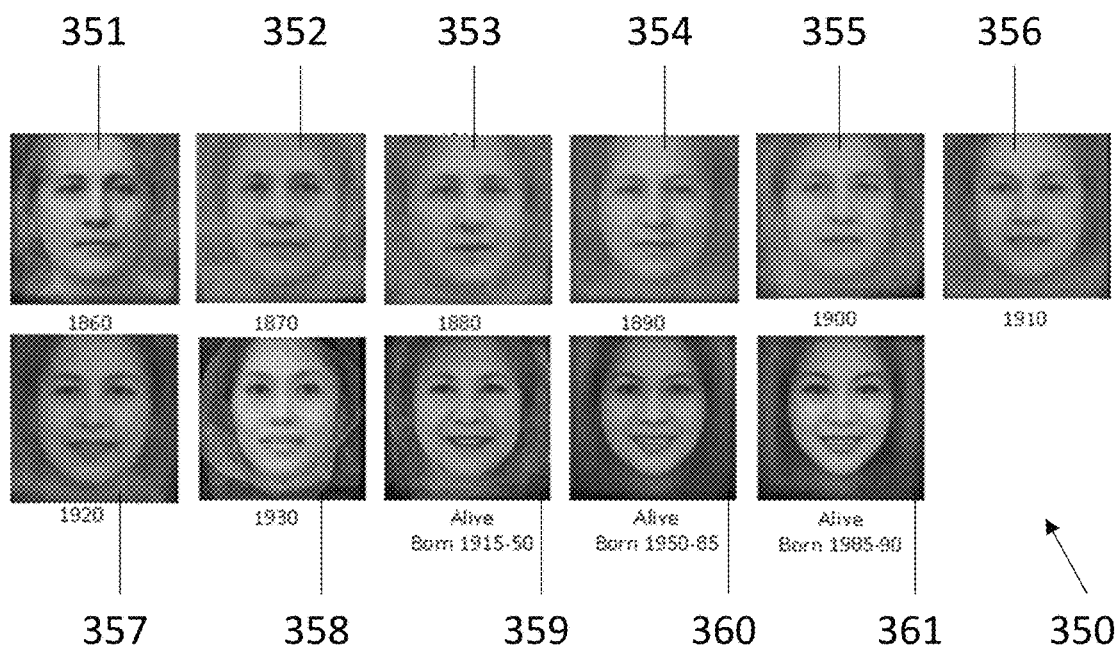
FIG. 3B is a collection of photo composites generated according to an embodiment.

Turning to FIG. 3B, photo composites 350 for a particular genetic group and sex over different time periods, generated according to the embodiments, is shown. The genetic group and sex is Filipino women. The photo composites 351, 352, 353, 354, 355, 356, 357, 358, 359, 360, 361 correspond, respectively, to historical persons ca. 1860, 1870, 1880, 1890, 1900, 1910, 1920, 1930, living persons with birth years 1915-1950, living persons with birth years 1950-1985, and living persons with birth years 1985-1990. The photo composites 351, 352, 353, 354, 355, 356, 357, 358, 359, 360, 361 were generated using, respectively, 19, 26, 23, 32, 19, 37, 46, 32, 17, about 45, about 90, and about 90 images. The photo composites 351, 352, 353, 354, 355, 356, 357, 358 which correspond to historical persons were generated using photos available from tree nodes in publicly viewable genealogical trees corresponding to ancestors of adult DNA test takers who consented to research.

Figure 3C:
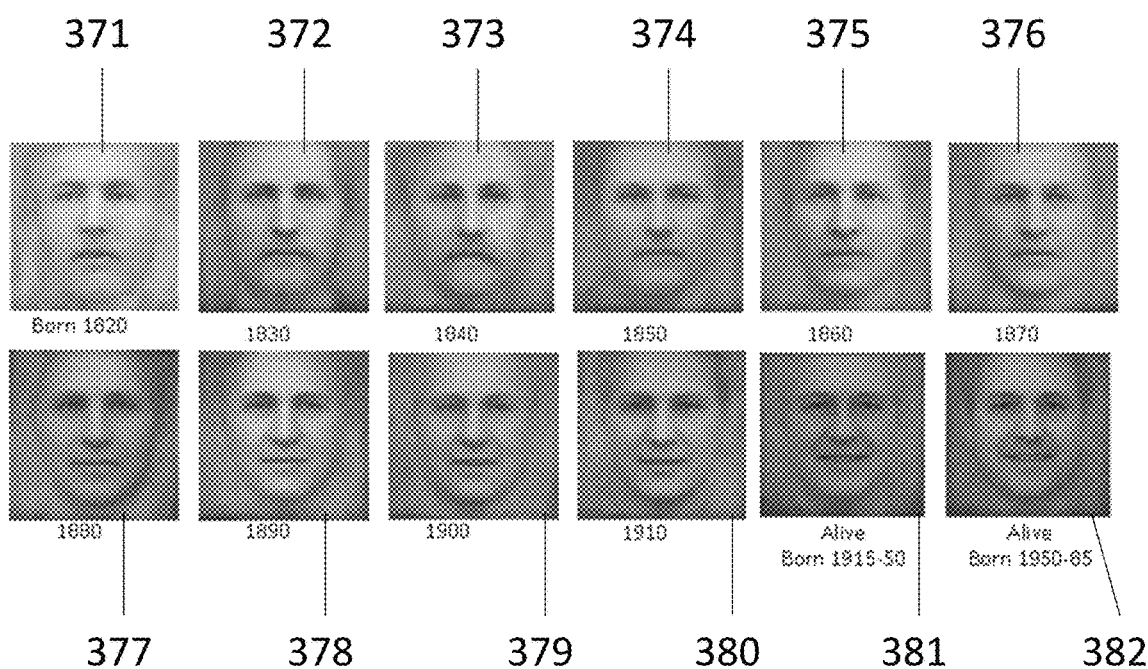
FIG. 3C is another collection of photo composites generated according to an embodiment.

Turning to FIG. 3C, photo composites 370 for another particular genetic group and sex over different time periods, generated according to the embodiments, is shown. The genetic group and sex is Mormon Pioneer men. The photo composites 371, 372, 373, 374, 375, 376, 377, 378, 379, 380, 381, 382 correspond, respectively, to historical persons born in 1820, 1830, 1840, 1850, 1860, 1870, 1880, 1890, 1900, 1910, living persons born 1915-1950, and living persons born 1950-1985. The photo composites 371, 372, 373, 374, 375, 376, 377, 378, 379, 380 were each generated using 50 photos, photo composite 381 was generated using 91 photos, and photo composite 382 was generated using 86 photos.

While FIGS. 3B and 3C show photo composites 350, 370 for communities corresponding to Filipino women and Mormon Pioneer men stratified by birth year, it will be appreciated that communities for which photo composites are generated according to the embodiments may be determined in any suitable manner. For example, communities may be determined by or subdivided into any suitable clusters or subdivisions as well as stratifying by birth year, sex, etc. Self-reported communities such as ethnicity or ethnicities may be utilized as suitable, such as for family planning.

Figure 3D:
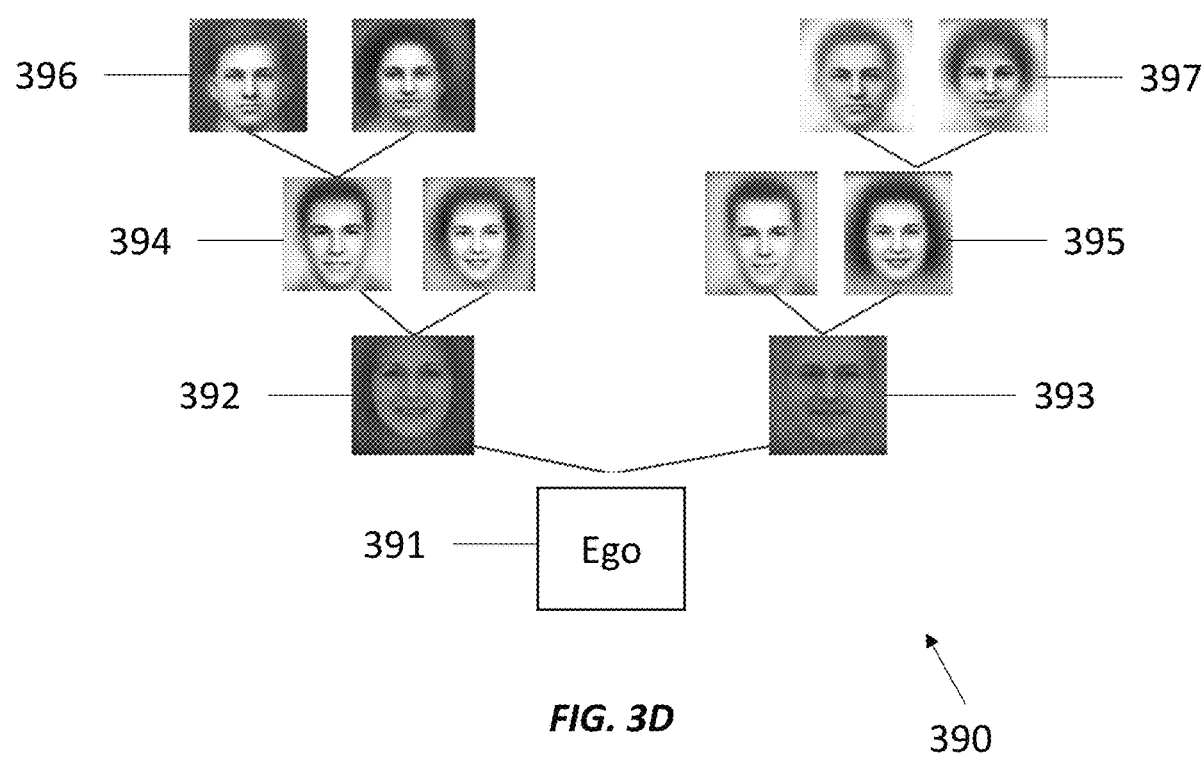
FIG. 3D is a diagram of a genealogical tree with profile pictures populated with photo composites generated according to an embodiment.

Turning to FIG. 3D, a genealogical tree 390 comprising one or more photo composites generated according to the embodiments is shown. The genealogical tree 390 may be generated by and/or for a user, represented by an ego node 391 and shown in a family view in FIG. 3D but in other embodiments shown in pedigree view. The genealogical tree 390 may comprise tree nodes in generations for a mother 392, a father 393, maternal grandparents 394, paternal grandparents 395, maternal great-grandparents 396, paternal great-grandparents 397, and so on. Each of the tree nodes may be configured to display or comprise a profile picture. In situations where one or more tree nodes does not have an associated profile picture, a photo composite may be generated automatically or on-demand.

Generated photo composites for each generation—parent, grandparent, great-grandparent—may be generated by automatically estimating a birth year or range of birth years based on the ego node 391 birth year, with photos identified and retrieved from pertinent genetic groups accordingly. For example, if the user represented by the ego node 391 has received DNA test results indicating a particular ethnicity or community on one or both parents' sides, in embodiments the photos identified and retrieved for the maternal grandparents and maternal great-grandparents and/or the paternal grandparents and paternal great-grandparents may be from the pertinent communities and sexes and based on the estimated birth years.

In embodiments the user self-identifies a maternal ethnicity and/or a paternal ethnicity, informing the determination of which photos to identify and retrieve. In other embodiments, genealogical information for one or more of the tree nodes is accessed to confirm or supplement genetic determinations of genetic community or ethnicity. For example, if the maternal side is determined based on the user's genealogical tree data to be of Indian descent whereas the paternal side is determined based on the user's genealogical tree data to be of Puerto Rican descent, this information is taken into account when selecting genetic communities from which to retrieve photos for photo composite generation. In embodiments, the maternal and/or paternal ethnicity may be automatically determined based on the DNA itself.

Phenotype Extraction

In another embodiment, the computing server 130 may use users' profile pictures or other pictures uploaded to the computing server 130 as a source of phenotype data. The phenotype data may be used to generate labeled data for training sets of machine learning models such as classifiers in predicting whether a user may have a particular phenotype based on the genetic data of the user. The phenotype data may also be used to determine what phenotypes may be typical in a genetic community. By extracting different traits in photos of users, the computing server 130 may provide the users with information that discusses the user's certain phenotypes.

For example, the computing server 130 may inform the user that the user shares an appearance trait (e.g., blue eye) with an ancestor, that there are certain common traits within a genetic community to which the user belongs, and that the user shares certain traits with a large number of members in the genetic community, what a likelihood is for a target user having a certain phenotype (e.g., baldness) based on the genetic data and the phenotype data of the genetic community to which the user belongs to, and what a likelihood is for a target user to possess a certain gene or set of genetic variants given the phenotypes of the target user.

This can be advantageous for users with mixed genetic heritages and who have no way as of yet of determining which traits were inherited from which community they hail from. By examining groups who differ only by birth-year bucket, one can visually observe how this group tends to age and use these observations to understand their aging process. By examining groups who differ only by sex, one can visually observe male-female differences in a particular population. By examining groups who differ by ethnicity and/or genetic community, one can visually observe changes between different parts of the world. By examining groups who differ by carrier status, one can visually observe differences between carriers and non-carriers. Such changes may not have been otherwise known or discernable. US Patent Application Publication 2020/0135296, entitled "Estimation of Phenotypes Using DNA, Pedigree, and Historical Data" published on Apr. 30, 2020, is incorporated by reference for all purposes.

By way of example, the computing server 130 may receive a plurality of photos of the individuals in the genetic community based on the users' upload and consented sharing with the computing server 130. Upon the users' consent, the computing server 130 may extract one or more phenotypes from the photos. A phenotype may be an appearance trait, a wellness trait, or a health trait. For example, appearance traits may include hair color, skin pigmentation, baldness, freckling, facial morphology, etc. Example wellness traits may include body mass index (BMI), skin burn risk, height, and weight. The computing server 130 may train one or more image classifiers, such as CNN-based image classifiers, to identify different types of traits. The computing server 130 may also train a scoring model to estimate the BMI of an individual based on a photo of the individual. For example, the landmarks identified from the facial photos for photo composite generation may be used for BMI estimation.

The computing server 130 retrieves genetic datasets of users. The computing system may generate different labeled training sets based on the extracted phenotypes and the genetic datasets. For example, for a classifier that determines a likelihood of a target user having a target phenotype, training sets may include labels that are determined based on whether users have the target phenotype as indicated by the data extracted from the photos. The training sets may also include features (e.g., represented by a feature vector) that are extracted from the genetic data of the users. Using the training sets with positive and negative labels, supervised learning techniques may be used to train the classifier. The trained classifier can be used to predict the target user's target phenotype (e.g., presence or absence of a trait in a binary classification, a continuous score such as a probability of a classification, or a risk score in models such as regression models) using the genetic data of the target user as input.

In another example, a classifier that uses phenotypes extracted from photos to determine the likelihood of a target user having a target genetic variant or set of variants may also be trained. The training sets may include labels that are determined from genetic data of other users based on whether those users have the target gene. The features of the training sets may be converted from the phenotype data that are extracted from the photos of those users. The trained classifier can be used to predict whether a target user possesses the target variant or gene based on the photo of the target user. For example, a convolutional neural network may be trained for this purpose.

In another embodiment, the computing server 130 may compute, based on the genetic dataset of the user and the statistical model, a likelihood that the user has one or more phenotypes. The computing system may validate the model based on survey answers from the users. In some cases, the computing server 130 may also determine a phenotype that was likely possessed by an ancestor of the user. The determination may be based on the genetic data of various users of the computing server 130 who are descendants of the ancestor. Based on the phenotypes of the descendants, the probability that the ancestor having the phenotype may be predicted. In some cases, the computing server 130 may possess a photo of the ancestor. The computing server 130 may extract the trait from the photo to determine the phenotype. In turn, the computing server 130 may identify a common phenotype that is shared by the user and the ancestor.

Figure 4:
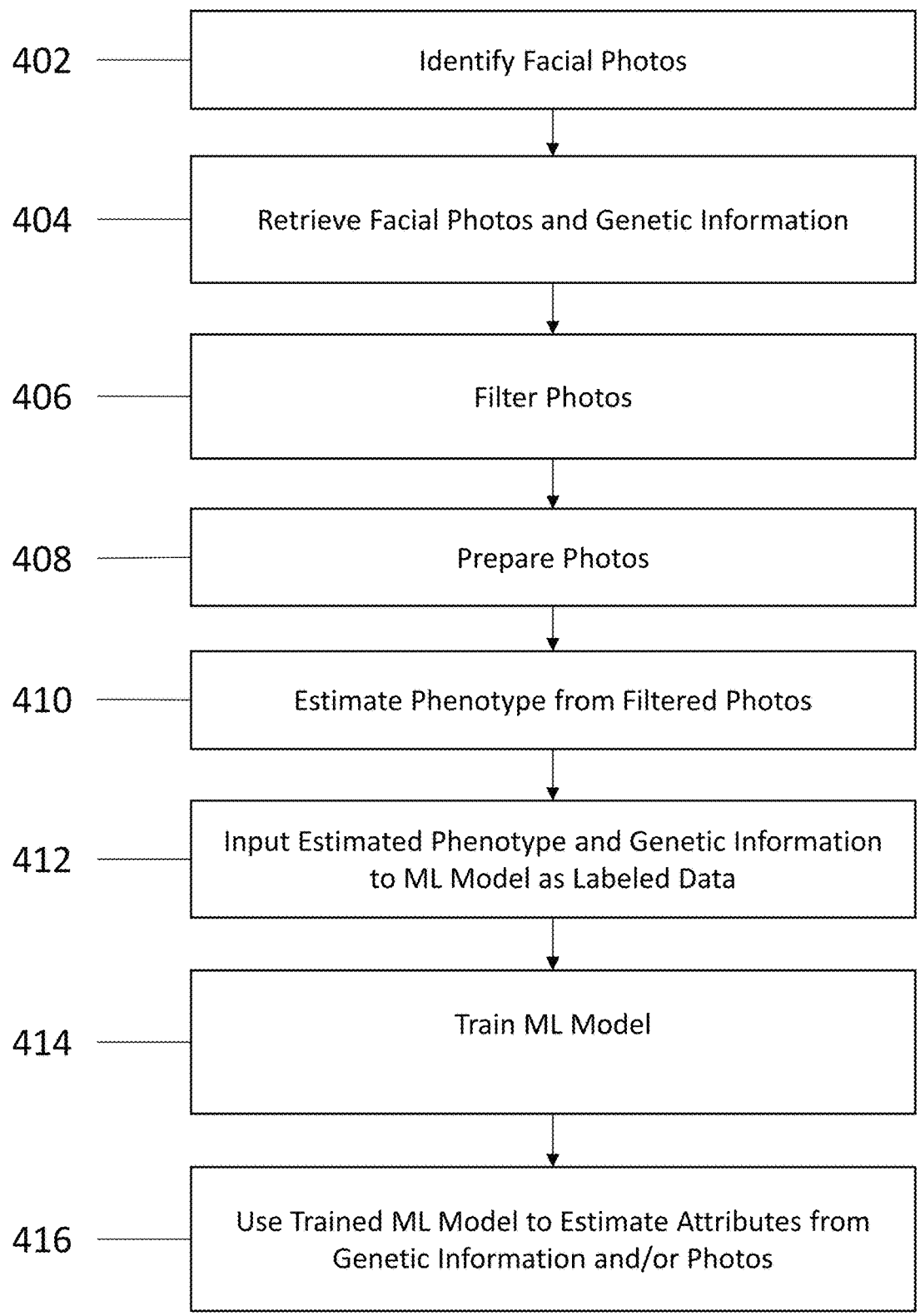
FIG. 4 is a method of estimating attributes from genetic information and/or photos according to an embodiment.

Turning to FIG. 4, a method 400 for extracting phenotypes from photos is shown and described. A step 402 includes identifying facial photos. The facial photos may be identified from and/or traversing a network of genealogical trees, such as a stitched tree database, and parsing profile photos, photo galleries, and other sources of image data. A step 404 includes retrieving facial photos and genetic information. In embodiments, only those facial photos identified from the network of genealogical trees that are associated with genetic information such as a DNA sample are retrieved and stored. In addition to the photo, the genetic information, sex, birth year, and/or other information such as genetic community assignment may likewise be obtained.

A step 406 includes filtering the facial photos. The filtering step may be based on resolution, detection of faces, color scheme, or otherwise. A step 408 includes preparing the retrieved and filtered photos by, e.g., removing images not containing a single face and/or segmenting images containing more than a single face, removing photos where a detected face is not straight-forward or substantially straight-forward, and/or estimating a facial bounding box and/or landmarks.

A step 410 includes estimating one or more phenotypes such as hair color, eye color, skin color, facial aspect ratio, baldness, wearing a hat, wearing glasses, etc. The phenotypes may be detected using a suitable computer vision modality, such as a convolutional neural network ("CNN") classifier which may be trained and utilized to estimate appearance attributes in facial photos. In an embodiment, a deep learning Caffe CNN is utilized, which may be trained on an augmented dataset.

A step 412 includes inputting the estimated phenotypes along with the retrieved genetic information to a machine learning model as labeled training data. The machine learning model may be a classifier model. A step 414 includes training the machine learning model using the labeled data.

A step 416 includes using the trained machine learning model to estimate attributes from genetic information and/or photos to predict a phenotype based on a user's genetic information and/or to estimate a genetic condition based on a user's phenotype.

Generating Content for a Genetic Community

In embodiment, content may be automatically created for a genetic community based on its respective set of enriched record collections. Enriched record collections may include content generated using computer vision and/or natural language processing ("NLP") modalities. For example, content may be created using NLP methods on structured data. Collections may contain records with structured data such as birth, death, census, and draft data. This data may be turned into structured/tabled data using methods such as optical character recognition ("OCR"). Structured/tabled data can be input into templates, such as narrative templates, to generate characterizations of community attributes during different periods of time.

For example, the template may inform a user of the number of births, deaths, and marriages per year on average in a community during a period of time, generating sentences such as: "In your community, between 1800 and 1850, there were X babies born a year on average and the average age of people was 50 based on birth certificates."

Content may also be created using NLP methods on unstructured data. Unstructured data may include data that cannot be aggregated into a common format. For example, newspapers, yearbooks, family history books, and journals may be classified as unstructured data. Data extracted from these sources may provide information about the politics, sporting and cultural events, and finances of the time. This information can be aggregated to provide users insights into the opinions and interests of community members during different eras. For example, the information may provide insight into the musical preferences and political opinions of a subset of community members that were alive in America during the 1950s. Sentences may be generated such as: "In your community, in the year 1950, Elvis was the top chart for Rock & Roll, Rocky Marciano was the boxing champion, and the S&P 500 was at an all-time high."

Further, content may be created by using computer vision methods on community records. Historical records often contain photos published of and by members of a genetic community. Photos from sources such as newspapers, yearbooks, and other materials published by or describing people in the community can be segmented using computer vision methods to illustrate trends in a community during different periods of time. For example, popular hairstyles, cuisines, cars, fashion, pigmentation, vignetting, and/or stylistic trends may be informed using segmented photos. The images may be aggregated and/or selected to show illustrations with sentences such as: "Here is a picture of the New York neighborhood where a lot of people from your community resided in 1950. These are pictures of the type of food that were made in the restaurants owned by people in your community. These are the popular hairstyles and popular fashions at that time."

Further, images may be presented as a collage or as an average image. If presented as a collage, the collage may be accompanied by a sentence such as: "Here are 50 popular types of food produced by people in your community." If presented as an average image, the averaged image may be accompanied by a sentence such as: "Here is the general clothing style of people in your community during this time."

Photos that contain the faces of community members may be used to generate aggregate facial photo composites of a genetic community. Aggregate facial photo composites may be weighted averages of multiple facial images. Landmarks are identified and a face average is created for people from different birth years and sexes.

Aggregate facial composites may be generated for different groups within a genetic community, separated or stratified by birth year, gender, and/or age, among other attributes. Photo composites of different groups within and among different genetic communities may be compared to examine groups by gender, genetic community, carrier status, and the like. For example, by examining groups who only differ by birth year, it can be observed how different groups tend to age; by examining groups who only differ by sex, it can be observed how men and women visually differ; and by examining groups who differ by carrier status, differences in carrier populations may be observed that were otherwise not known.

Figure 5:
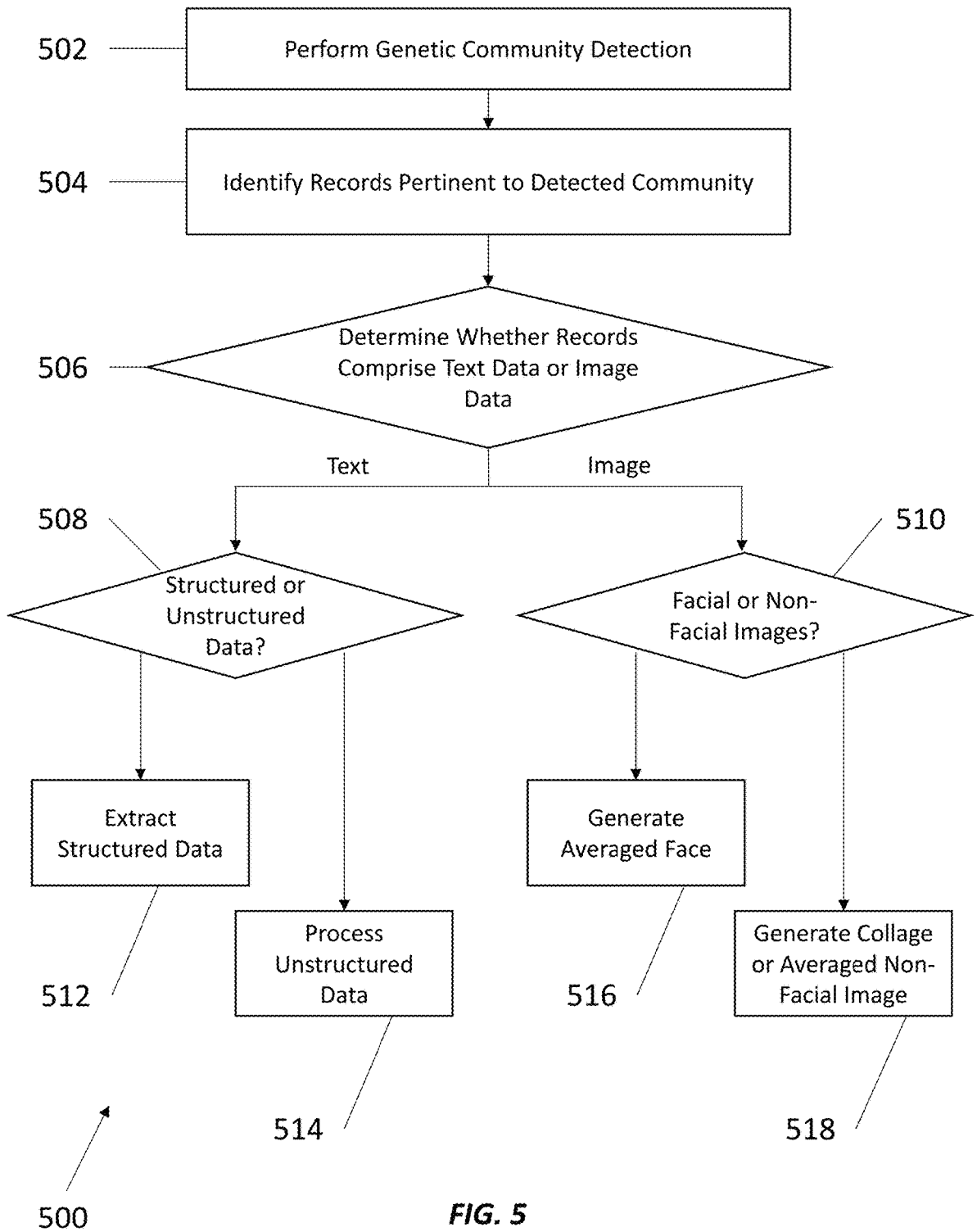
FIG. 5 is a method of generating content from a record.

Turning to FIG. 5, a method 500 for generating content for a genetic community is shown and described. The method 500 includes a step 502 of performing genetic community detection. The genetic community detection may utilize genetic information to determine an ethnicity, a community, common ancestry, or other relationship between users of, e.g., a genealogical research service. A step 504 includes identifying and retrieving records pertinent to the detected community. Once a genetic community has been determined, records stored or accessed by the genealogical research service may be identified from a records database by, e.g., searching the records database using a location, time period, or keyword-based search. Entire collections may be identified and retrieved. A step 506 includes determining whether the retrieved records and/or collections comprise text data or image data.

A step 508 includes determining whether text data, such as a particular record, comprises structured or unstructured data. If a record or collection is determined to comprise structured data, a step 512 includes extracting the structured data. For example, data in table form can be used in a template to generate a statement about statistics regarding birth, death, occupations, stock price, home price, etc. If a record or collection is determined to comprise unstructured data, a step 514 includes processing the unstructured data. For example, free text is processed to collect information not available in table format, such as music, cultural events, politics, sports, etc.

A step 510 includes determining whether image data comprises facial or non-facial images. If a record or collection is determined to comprise facial images, a step 516 includes generating an averaged face and/or a photo composite as described previously. In embodiments, images of famous people belonging to the determined genetic community may be retrieved and highlighted. If a record or collection is determined to comprise non-facial images, a step 518 includes generating a collage or averaged non-facial image 518. For example, a collage of images of landscapes, cars, food, hairstyles, and/or fashion can be generated. Alternatively, or additionally, average images of one or more categories of non-facial images may be generated. The images may be selected based on image date so as to show community-specific details for a defined time period.

Computing Machine Architecture

Figure 6:
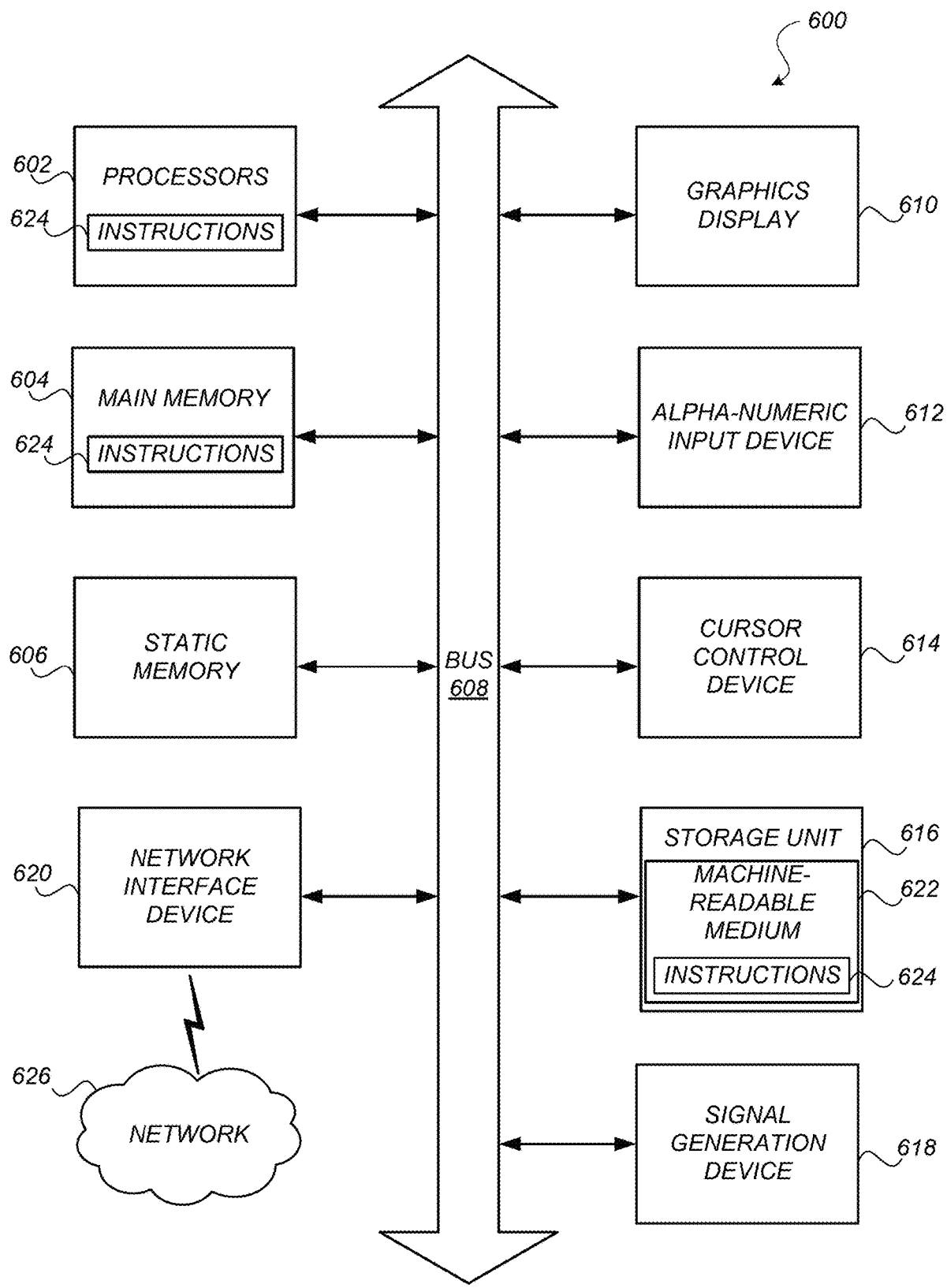
FIG. 6 is a block diagram illustrating an example computer architecture in accordance with an embodiment.

FIG. 6 is a block diagram illustrating components of an example computing machine that is capable of reading instructions from a computer-readable medium and execute them in a processor (or controller). A computer described herein may include a single computing machine shown in FIG. 6, a virtual machine, a distributed computing system that includes multiples nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1 and 2, including but not limited to, the client device 110, the computing server 130, and various engines, interfaces, terminals, and machines shown in FIG. 2. While FIG. 6 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that store computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 602 and reduces the space required for the memory 604. For example, the machine learning methods described herein reduces the complexity of the computation of the processors 602 by applying one or more novel techniques that simplify the steps in training, reaching convergence, and generating results of the processors 602. The algorithms described herein also reduces the size of the models and datasets to reduce the storage space requirement for memory 604.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alphanumeric input device 612 (e.g., a keyboard), a cursor control device 614 (e.g., a mouse, a trackball, a joystick, a motion sensor, or other pointing instrument), a storage unit 616 (a hard drive, a solid state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave. The computer-readable medium may also be referred to as hardware storage device.

Example Machine Learning Model

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, the process of extracting traits from photo discussed above, various feature recognition and other processes may apply one or more machine learning and deep learning techniques. In one embodiment, object recognition is performed using a CNN, whose example structure is shown in FIG. 7.

In various embodiments, the training techniques for a machine learning model may be supervised, semi-supervised, or unsupervised. In supervised learning, the machine learning models may be trained with a set of training samples that are labeled. For example, for a machine learning model trained to classify photo traits, the training samples may be different pictures of individuals labeled with the type of traits. The labels for each training sample may be continuous, binary, or multi-class. In training a machine learning model for feature recognition, the training samples may be pictures of individuals with the types of trait manually identified. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. In object recognition (e.g., object detection and classification), the objective function of the machine learning algorithm may be the training error rate in classifying objects in a training set. Such an objective function may be called a loss function. Other forms of objective functions may also be used, particularly for unsupervised learning models whose error rates are not easily determined due to the lack of labels. In image segmentation, the objective function may correspond to the difference between the model's predicted segments and the manually identified segments in the training sets. In various embodiments, the error rate may be measured as cross-entropy loss, L1 loss (e.g., the sum of absolute differences between the predicted values and the actual value), L2 loss (e.g., the sum of squared distances).

Figure 7:
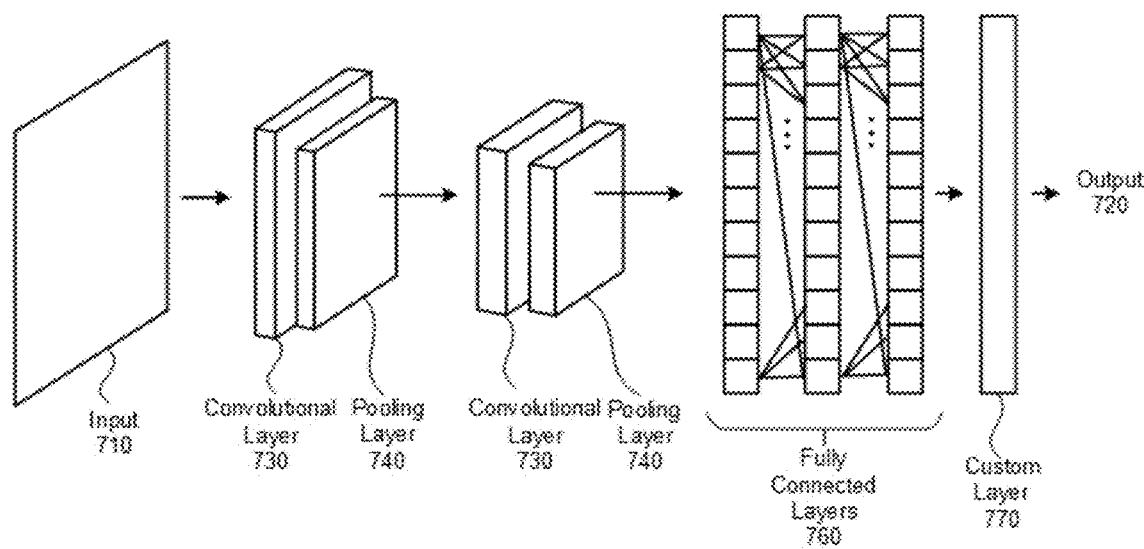
FIG. 7 is a diagram illustrating an example machine learning model in accordance with an embodiment.

Referring to FIG. 7, a structure of an example CNN is illustrated, according to an embodiment. The CNN 700 may receive an input 710 and generate an output 720. The CNN 700 may include different kinds of layers, such as convolutional layers 730, pooling layers 740, full connected layers 760, and custom layers 770. A convolutional layer 730 convolves the input of the layer (e.g., an image) with one or more kernels to generate different types of images that are filtered by the kernels to generate feature maps. Each convolution result may be associated with an activation function. A convolutional layer 730 may be followed by a pooling layer 740 that selects the maximum value (max pooling) or average value (average pooling) from the portion of the input covered by the kernel size. The pooling layer 740 reduces the spatial size of the extracted features. The layers 730 and 740 may be followed in multiple fully connected layers 760 that have nodes (represented by squares in FIG. 7) connected to each other. The fully connected layers 760 may be used for classification and object detection. In one embodiment, one or more custom layers 770 may also be presented for the generation of a specific format of output 720. For example, a custom layer may be used for image segmentation for labeling pixels of an image input with different segment labels.

The order of layers and the number of layers of the CNN 700 in FIG. 7 is for example only. In various embodiments, a CNN 700 includes one or more convolutional layer 730 but may or may not include any pooling layer 740 or recurrent layer 750. If a pooling layer 740 is present, not all convolutional layers 730 are always followed by a pooling layer 740. A CNN may also include a recurrent layer, which is not shown in FIG. 7. For each convolutional layer 730, the sizes of kernels (e.g., 3×3, 5×5, 7×7, etc.) and the numbers of kernels allowed to be learned may be different from other convolutional layers 730.

A machine learning model may include certain layers, nodes, kernels and/or coefficients. Training of a neural network, such as the CNN 700, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prediction, object detection, image segmentation, or another suitable task for which the model is trained.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps, and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. patent application Ser. No. 15/519,099, entitled "Haplotype Phasing Models," filed on Oct. 19, 2015, (2) U.S. patent application Ser. No. 15/168,011, entitled "Discovering Population Structure from Patterns of Identity-By-Descent," filed on May 28, 2016, (3) U.S. patent application Ser. No. 15/519,104 "Reducing Error in Predicted Genetic Relationships," filed on Oct. 14, 2015, (4) U.S. patent application Ser. No. 15/209,458, entitled "Local Genetic Ethnicity Determination System," filed on Jul. 13, 2016, and (5) U.S. patent application Ser. No. 14/029,765, entitled "Identifying Ancestral Relationships Using a Continuous stream of Input," filed on Sep. 17, 2013.

The invention claimed is:

1. A computer-implemented method comprising:
receiving genetic data and/or genealogy data of a plurality of individuals;
classifying a subset of the individuals as a group based on at least one characteristic extracted from the genetic data and/or the genealogy data;
retrieving a plurality of photos of the subset of the individuals in the group or their ancestors;
filtering the plurality of photos;
sampling a subset of photos from the plurality of photos;
determining facial landmarks in the subset of photos;
registering the facial landmarks of each photo to a standard set of facial landmarks;
aggregating, based on the facial landmarks, the subset of photos to generate a photo composite of the group of individuals sharing the at least one characteristic.

2. The computer-implemented method of claim 1, further comprising:
computing and applying a similarity transform to the subset of photos and the registered facial landmarks.

3. The computer-implemented method of claim 1, wherein the at least one characteristic includes one or more of: ancestral ethnicities, genetic communities, sex, genetic variants, birth year buckets, age in photo, one or more common ancestors, or identity-by-descent (IBD) segments.

4. The computer-implemented method of claim 2, further comprising:
updating an estimate of transformed average landmarks.

5. The computer-implemented method of claim 4, further comprising:
calculating a triangularization of transformed average landmarks.

6. The computer-implemented method of claim 5, further comprising:
warping the subset of photos to the transformed average landmarks.

7. The computer-implemented method of claim 6, wherein aggregating based on the facial landmarks includes combining intensities of the warped subset of photos.

8. The computer-implemented method of claim 1, wherein retrieving the plurality of photos includes traversing a network of interconnected genealogical trees and/or a records database.

9. The computer-implemented method of claim 1, wherein filtering the plurality of photos includes filtering photos based on at least one of resolution, a number of faces detectable in the photos, and color scheme.

10. The computer-implemented method of claim 1, wherein the subset of photos includes at least 10 photos.

11. A hardware storage device having stored thereon computer-executable instructions that, when executed by one or more processors, cause a computing system to perform at least the following:
receive genetic data and/or genealogy data of a plurality of individuals;
classify a subset of the individuals as a group based on at least one characteristic extracted from the genetic data and/or the genealogy data;
retrieve a plurality of photos of the subset of the individuals in the group or their ancestors;
filter the plurality of photos;
sample a subset of photos from the plurality of photos;
determine and register facial landmarks in the subset of photos;
compute and apply a similarity transform to the subset of photos and the registered facial landmarks;
update an estimate of transformed average landmarks;
calculate a triangularization of transformed average landmarks;
warp the subset of photos to the transformed average landmarks;
aggregate, based on the facial landmarks, the subset of photos to generate a photo composite of the group of individuals sharing the at least one characteristic.

12. The hardware storage device of claim 11, wherein aggregating based on the facial landmarks includes combining intensities of the warped subset of photos.

13. The hardware storage device of claim 11, wherein retrieving a plurality of photos includes determining one or more of: an individual associated with a photo has provided consent, the photo is in a publicly viewable genealogical tree, and the individual is an adult.

14. The hardware storage device of claim 11, wherein classifying a subset of the individuals as a group includes determining a sex, a birth year, birth year bucket, or age in the photo, and a genetic relatedness including one or more of ancestral ethnicities, genetic communities, genetic variants, one or more common ancestors, and identity-by-descent (IBD) segments.

15. The hardware storage device of claim 14, wherein classifying the subset of the individuals as a group includes receiving a user specification of the sex, the birth year or the age in the photo, and the genetic relatedness.

16. A system comprising:
one or more processors; and
one or more hardware storage devices having stored thereon computer-executable instructions that, when executed by the one or more processors, configure the system to perform at least the following:
receive genetic data and/or genealogy data of a plurality of individuals;
classify a subset of the individuals as a group based on at least one characteristic extracted from the genetic data and/or the genealogy data, the at least one characteristic being selected from determining a sex, a birth year or age in a photo, and a genetic relatedness;
retrieve, from one or more of a record database and a network of genealogical trees, a plurality of photos of the subset of the individuals in the group or their ancestors;
filter the plurality of photos;
sample a subset of photos from the plurality of photos;
determine and register facial landmarks in the subset of photos;
compute and apply a similarity transform to the subset of photos and the registered facial landmarks;
update an estimate of transformed average landmarks;
calculate a triangularization of transformed average landmarks;
warp the subset of photos to the transformed average landmarks; and
detect a phenotype from the warped subset of photos.

17. The system of claim 16, wherein the phenotype is an appearance phenotype or a wellness phenotype.

18. The system of claim 16, wherein the phenotype is provided, with the subset of photos and the genetic data of the plurality of individuals, to a phenotype-prediction machine learning model as training data.

19. The system of claim 16, wherein the subset of photos is augmented using one or more transformations selected from horizontal flip, minor random positive and negative rotations, random brightness deltas, random contrast deltas, random color shift deltas, grayscaling, minor random cropping modifications, and saturation modifications.

* * * * *